May 2, 1967 G. N. BROWN ET AL 3,317,191
METHOD AND APPARATUS FOR SOLIDS BLENDING
Filed Nov. 8, 1965 4 Sheets-Sheet 3

INVENTORS
GEORGE N. BROWN
WILLARD D. STENBORG

BY Harry J. McCauley

ATTORNEY

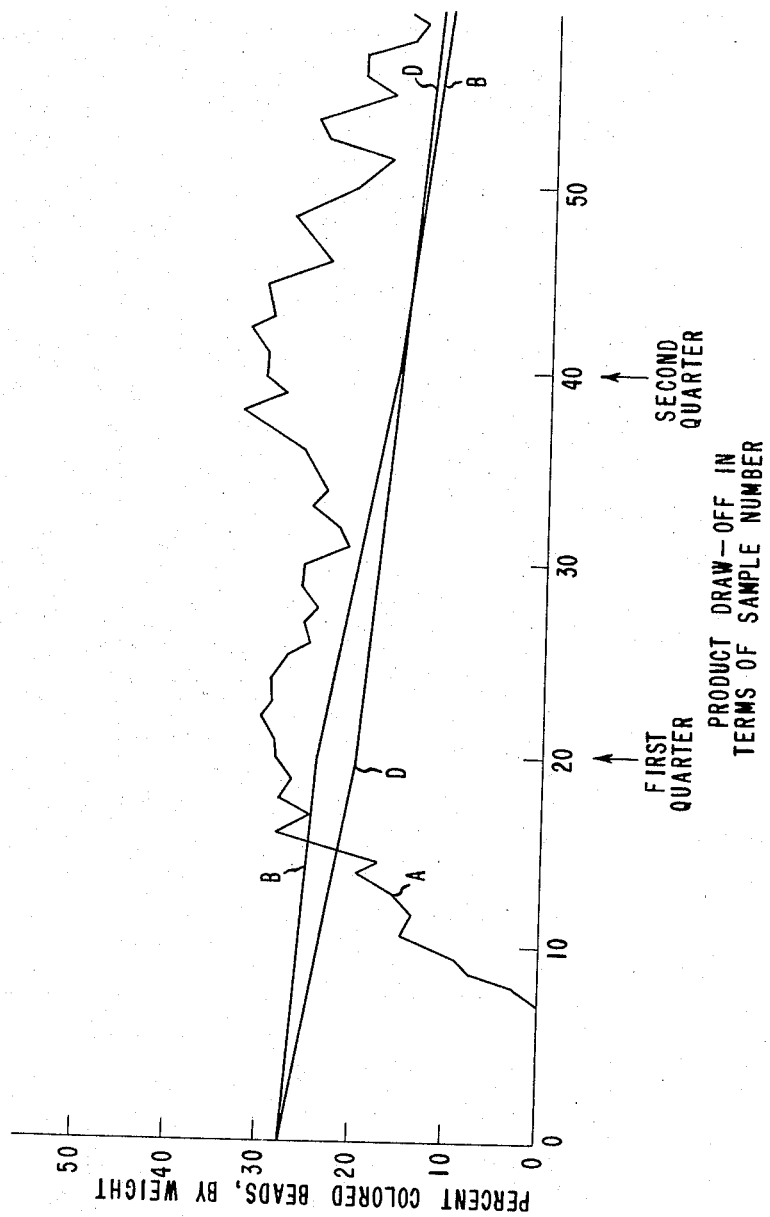

United States Patent Office

3,317,191
Patented May 2, 1967

3,317,191
METHOD AND APPARATUS FOR SOLIDS BLENDING
George N. Brown and Willard D. Stemborg, Wilmington, Del., assignors to E. I. du Pont de Nemours and Company, Wilmington, Del., a corporation of Delaware
Filed Nov. 8, 1965, Ser. No. 506,656
7 Claims. (Cl. 259—4)

This invention relates to a method and apparatus for blending of solids, and particularly to a gravity-flow type of blending wherein solids are withdrawn simultaneously from a multiplicity of levels within the heterogeneous solids mass at points peripherally adjacent thereof and thereafter recombined.

Solids blending is desirable in many manufacturing processes, especially those wherein the solids are the products of individual batch operation and, as a result, possess more or less varying properties. A typical example is the manufacture of polymers, consecutive product batches of which can vary in physical properties, such as melt viscosity and the like, so that subsequent utilization equipment, such as screw extruders, require painstaking readjustment of settings and clearances whenever one batch of feed material is depleted and a new batch becomes available in supply continuation.

The present invention is, in certain respects, an improvement on the invention of Re. Patent 25,687, as to which one of the present inventors was a co-inventor, in that intimately blended product draw-off is, according to this invention, made substantially independent of either feed introduction to the blender vessel or recycle return of solids withdrawn from the vessel and restored thereto incident to the blending operation.

Figure 1:
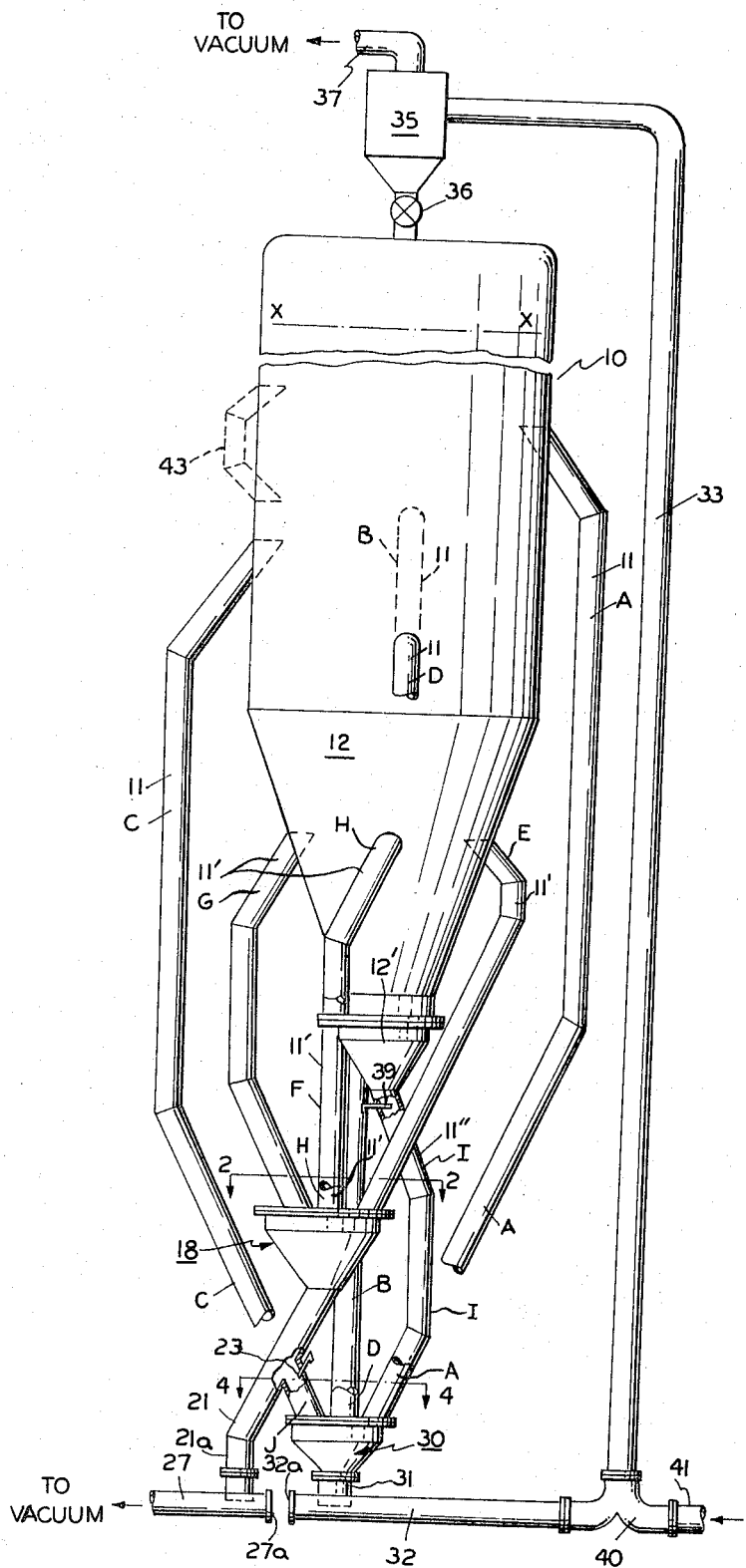
Figure 2:
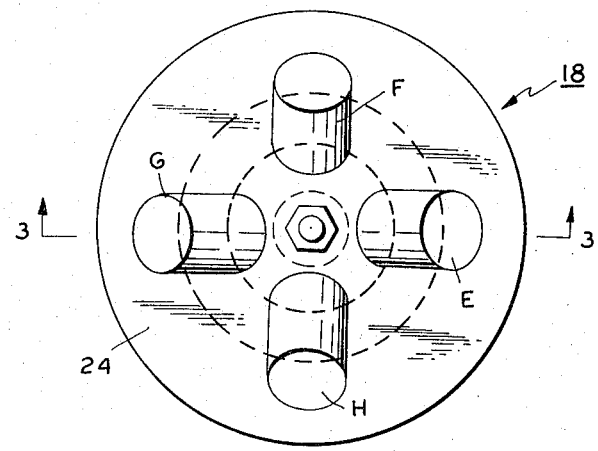
Figure 3:
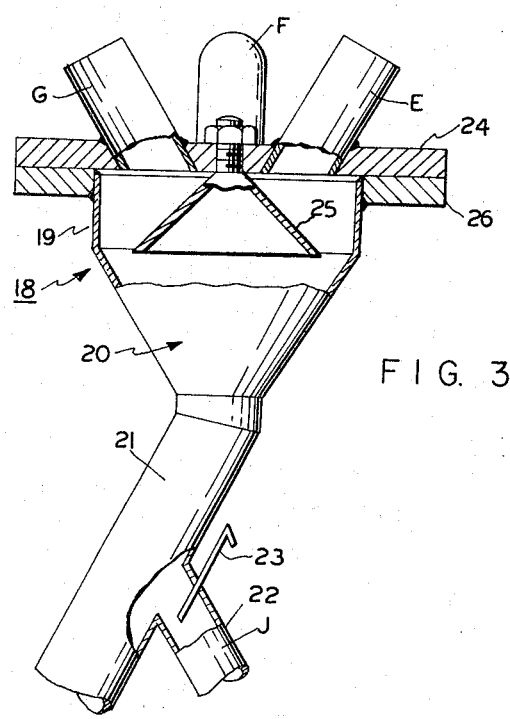
Figure 4:
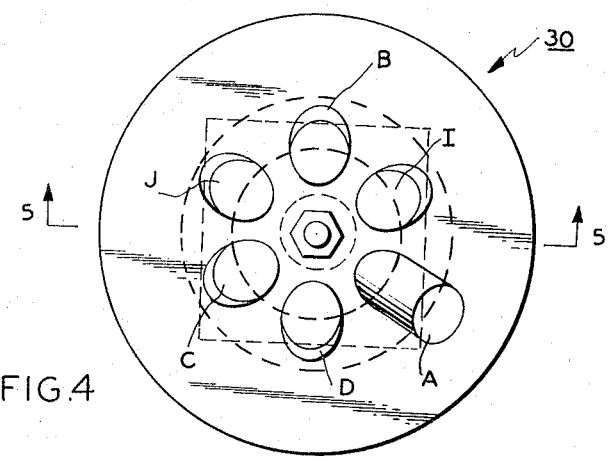

An object of this invention is, therefore, the provision of an improved process and apparatus for gravity-flow solids blending wherein blended product removal can be effected substantially independently of both raw material feed introduction and also of recycle of the partially blended material. Another object of this invention is to provide an improved solids blending process and apparatus wherein exteremely intimate solids blending is obtained very speedily and with a minimum of inventory hold-up of process material chargeable to the blending per se. Other objects of this invention include the provision of a gravity-flow solids blending process and apparatus which is economical in equipment first cost and maintenance, low in operational power cost and one to which presently installed plant equipment can be readily converted at relatively low labor and material expense. The manner in which these and other objects of this invention are attained will become clear from the following detailed description and reference to the related drawings, in which:

FIG. 1 is a partially schematic side elevational view of a preferred embodiment of apparatus according to this invention utilizing a conical bottomed cylindrical vessel for retention of the main solids mass being blended, some of the downcomers being broken away, particularly in the vicinity of the solids collectors, to better show the details of construction, FIG. 2 is a plan view of the upper solids collector taken on line 2—2 of FIG. 1, FIG. 3 is a partial sectional view taken on line 3—3, FIG. 2, FIG. 4 is a plan view of the lower solids collector taken on line 4—4, FIG. 1, the attachment of but one downcomer, i.e., A, being detailed, whereas only the ports for reception of the remaining downcomer discharge ends are shown.

Figure 5:
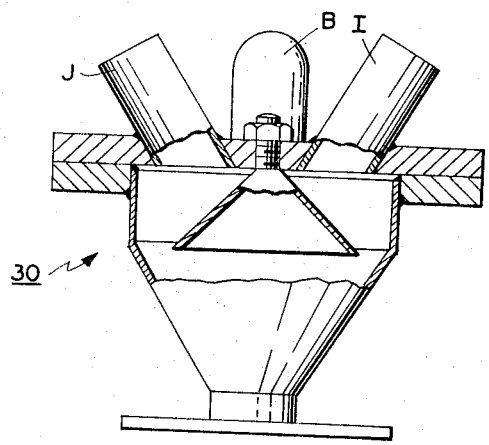

FIG. 5 is a partial sectional view taken on line 5—5, FIG. 4, showing attachment of all of the downcomers to the collector, and FIG. 6 is a plot of both point (Trace A) and comulative residual percent (Trace B) colored beads as ordinate versus product draw-off on the abscissa for a blender constructed according to this invention, together with a plot (D) of the theoretical percent residual colored beads.

Generally, this invention comprises a method for blending solids comprising confining a mass of the heterogeneous solids in an elevated column to which fresh solids to be blended are added at the top, withdrawing from the mass in a generally vertical direction and within about one-fourth of the distance from the center of the solids mass to the confining wall of the column taken at the level of withdrawal inwardly from the periphery of the mass substantially equal amounts of the solids per unit time simultaneously by gravity flow from a multiplicity of regions disposed lengthwise of the solids mass and substantially equiangularly around the periphery of the mass, collecting solids withdrawn from the mass as a first blended product fraction derived in the proportion of at least 75% from the lower 25% of the volume of the mass of heterogeneous solids within the elevated column, collecting the remaining solids withdrawn from the mass as a second fraction separate from the first blended product fraction, and recycling the second fraction to the top of the elevated column, together with apparatus for carrying out the method.

Referring to FIG. 1, a preferred embodiment of blender according to this invention is constructed in the following approximate relative proportions in terms of the diameter $d$ of the cylindrical section 10 of the apparatus:

Overall height, including bottom cone section = $4.6d$
Height of cylindrical section 10 = $3.15d$
Height of cone bottom section = $1.45d$ The cylindrical section 10 of this apparatus is provided with four downcomers 11, the foremost of which are broken away in FIG. 1 to better show the overall construction, spaced equiangularly around the periphery of section 10 and lengthwise one from another and above the lower edge of section 10, at intervals of $0.4d$.

Downcomers 11 are vertically disposed lengths of open pipe, typically 3" diameter, of the general design taught in Reissue Patent 25,687 supra, i.e., with solids inlet withdrawal openings disposed in the vicinity of the periphery of the solids column, although such withdrawal can be effected inwardly radially up to about 25% of the column radius at a given level of withdrawal (or up to about 25% of the distance from the wall to the center of the solids mass of the column for non-cylindrical columns) without serious adverse consequences to the blending operation. The fractions of solids withdrawn by gravity are thereafter combined in separate collectors as hereinafter described, thereby effecting, in the aggregate, the improved blending of this invention.

Best results are obtained by withdrawing the solids in a generally vertical direction downwards from the mass accumulation, and thus it is preferred to remove the several solids fractions through openings which have the inlet mouths disposed in substantially horizontal planes, although it will be understood that some variation is permissible in this regard. However, withdrawal ports flush with the inside wall of the vessel impede free flow of the solids and, besides, give poorer blends.

In addition, it is very much preferred to effect the solids withdrawal along side-discharging paths as shown (typically, at 60° inclination to the horizontal), so as to minimize solids hold-up within the vessel as well as to facilitate clean-up activities.

The conical bottom section 12 of the blender vessel is provided with four equiangularly spaced downcomers 11′, these again being lengths of near-vertical open pipe, typically 3″ in diameter, which have solids inlet ports identical in design to those hereinbefore described. In view of the relatively small volume of conical section 12 as compared with cylindrical section 10, and the fact that the same number of downcomers, namely, four, is provided for solids removal here, lengthwise spacing of downcomers 11′ can be dispensed with in section 12 in favor of the simpler construction shown, wherein the downcomer solids withdrawal inlets are all disposed on a substantially common horizontal plane. In this instance these withdrawal inlets were spotted at a common horizontal level located about 0.43, or seven-sixteenths, of the length of bottom section 12 measured from the line of joinder of vessel sections 10 and 12 (i.e., 0.6d below the line of joinder for the specific design described).

The lower end of bottom section 12 is constricted to a terminal diameter of about 3″ by transition fitting 12′, after which it opens into a near-vertical downcomer 11″ which is again a 3″ diameter open pipe length. This downcomer is preferably provided with a slide valve 39 mounted closely adjacent to the inlet connection with transition fitting 12′, to permit extreme throttling of flow through downcomer 11″ as hereinafter described if this should ever become necessary, this being purely a design convenience and not essential to operation. Thus, in total, there are nine downcomers in the blender design described, four denoted 11 emanating from cylindrical section 10, four denoted 11′ emanating from about midlength of cone bottom section 12, and, finally, a ninth length of cone bottom section 12. For purposes of ready identification, the downcomers are individually denoted by separate letters of the alphabet in the order A to I, ranging from top to bottom, in which they remove solids from the blender vessel.

Two separate solids collectors are employed in the apparatus of this invention, these being substantially identical in construction and similar to the design automatically regulative to produce equal solids flow through multiple downcomers taught in U.S. patent application Ser. No. 320,704, now Patent No. 3,208,737, as to which one of the present applicants was also the inventor. Thus, upper collector 18 (refer FIGS. 2 and 3) comprises a common solids receiver made up of a squat open cylindrical upper portion 19 (typically 14″ dia. x 4″ high) weld-joined at the bottom to a frusto-conical funnel 20 (typically 9″ high) discharging at the lower end into a blended product-receiving draw-off conduit 21 (typically 4″ dia.) disposed about 30° off the vertical in its orientation. Conduit 22, alphabetical designation J (typically 3″ dia.), disposed about 30° off the vertical in the reverse direction from conduit 21, is connected in open communication with conduit 21 at a point approximately two conduit 21 diameters downstream from the connection of the latter with funnel 20, a slide valve 23 being preferably provided at the conduit juncture to permit a wider range of solids product removal from the system than would otherwise be possible, all as hereinafter described.

The outlet ends of downcomers 11′, i.e., E, F, G and H, weld-joined within inwardly slanted holes drilled in the collector cover plate 24, are spotted equiangularly apart from one another at 90° intervals as shown in FIG. 2 and discharge solids delivered therefrom at equal inclinations of about 60° from the horizontal against frusto-conical baffle 25, having a slope angle of about 60°, disposed coaxially within the collector with top edge bolt-attached to the underside of cover plate 24. The height of baffle 25 is about 4″, disposing its lower peripheral edge slightly outwardly from the circle of centers of discharge outlets of the four downcomers. The close vertical disposition of the upper edge of baffle 25 with respect to the downcomer outlets represents a slight departure from the somewhat greater spacing constituting the preferred construction of U.S. patent application Ser. No. 320,704 supra; however, the somewhat reduced intermixing of the solids occurring after discharge from the downcomer outlets into the collector with the instant design is more than compensated, as a practical matter by the advantage of decreased head room obtained through disposing the upper edge of the deflector in a common plane with the downcomer outlets.

The collector is provided with a peripheral flange 26 welded to the upper edge of the cylindrical portion 19, and cover plate 24 is attached thereto by a bolt circle not detailed in the drawings.

Since, as hereinafter described in greater detail, collector 18 is reserved to blended product withdrawal, conduit 21 is terminated in a short vertical length 21a (FIG. 1) having its discharge end disposed within horizontal solids-receiving conduit 27 at approximately the latter conduit's center line. Where vacuum is resorted to for product withdrawal, as will be described, the right-hand end 27a of conduit 27 is left open to the atmosphere, whereupon blended product is removed by suction applied to the left-hand end.

Referring to FIGS. 4 and 5, lower solids collector 30 is in all respects identical with upper solids collector 18 and is therefore not described further. However, collector 30 accommodates the outlets of six downcomers (A, B, C, D, I and J) disposed 60° apart on a common circle, and each inclined inwardly at an angle of 60° to the horizontal. Since the function of lower solids collector 30 is recycle, the lower end opens into a stub connection 31 (FIG. 1) which, like pipe 21a, terminates within conduit 32 at approximately the latter's center line. With vacuum recycle circulation, the left-hand end 32a of conduit 32 is also left open to the atmosphere in the same manner as already described for conduit 27.

It should be mentioned that solids collectors 18 and 30 are completely effective in themselves as automatic solids flow equalizers operative on multiple, fully open conduit discharges into their tops, as hereinbefore described. However, it is sometimes desirable to restrict the discharge from cone section 12 via downcomer 11″ to some level less than the flows carried by the individual fully open conduits A, B, C and D and, accordingly, slide valve 39 is a convenient adjunct for this purpose. Also, it is sometimes desirable to withdraw more product from the system via conduit 21 than can be accomplished where a fully open product diversion path J is cross-connected between conduit 21 and collector 30, making it desirable to incorporate slide valve 23 as a convenience in this regard.

Line 32 is typically 3″ diameter and discharges into vertical return pipe 33 (typically, 4″ dia.) rising vertically to a height well above the upper closed end of the blender cylindrical section 10, discharging then into the upper part of an elevated closed receiver 35 which has a conical bottom end. The lower end of receiver 35 is provided with a conventional power-driven star feeder mechanism, shown schematically at 36, which continuously discharges accumulated solids from the receiver into the blender proper. Vacuum transport for solids recycling is provided by suction blower connected to conduit 37 in open communication with the top of receiver 35.

Identically the same vacuum system as employed for recycle is entirely practicable for product removal, and, accordingly, the showing is not duplicated in FIG. 1.

A convenient way of introducing the raw, unblended solids feed into the apparatus consists in providing the conduit 32–33 juncture with a Y fitting 40 at the end where the course changes from horizontal to vertical, and this is detailed in FIG. 1. A straight run conduit 41 (typically, 3″ dia.) leads to the right from the other Y arm to any common source of solids supply, such as a temporary storage bin or the like, not shown, so that the suction pulled on vacuum connector 37 draws fresh material into the system (whenever this is made available) simultaneously with the conduct of recycle via lower collector 30 and the horizontal run of conduit 32 connected therewith.

It is sometimes desirable to accelerate the progress of solids from one specific region in the blender to some lower region, and re-entry downcomers such as that shown in broken line representation at 43, FIG. 1, are effective for this purpose. The inlet ends of these round pipe downcomers are in all respects identical to those of downcomers 11 and 11'; however, in order to increase the velocity of throughput of solids passing through the re-entry conduits, it is desirable to extend the discharge end exit lengths somewhat inwards of the blender vessel wall, such as, typically, approximately 6". Again, in the interests of obtaining uniform solids transport from a given level or region, it is preferred to use even numbers of re-entry downcomers in association one with another, even though only one is shown in FIG. 1, these being then disposed symmetrically in a peripheral as well as longitudinal sense with respect to their neighbors.

The specific blender hereinbefore described was designed in the light of operating experience obtained with a test model constructed to somewhat the same general proportions and according to substantially the same design, so that FIG. 1 is equally applicable to the following description. The solid material employed for testing was polyethylene beads having the shape of oblate spheroids about ⅛" maximum dimension and a bulk density of about 45 lbs./ft.$^3$.

The test blender had a 20" internal diameter, with a height of cylindrical section 9'-0" and a cone bottom height of 16", the included angle of the cone being 60°. There were nine downcomers, each 3" dia. open tubes, emptying into two separate collectors in the same arrangement of connections hereinbefore described for the preferred design of blender. Because of the small size of cone involved, and the very high inherent draw-off capability of the central downcomer 11' having its inlet connected to the apex of cone bottom 12, the four next higher downcomers 11' were connected with their outlets opening at 90° equiangular spacings into the lower part of the cylindrical portion 10 of the test blender, these being disposed longitudinally apart at distances of 6" starting from the lowermost, which entered the blender at the cone 12-cylinder 10 junction line.

A "buffer zone" was provided in the test blender by allowing a 24" length of cylinder 10 above the inlet of the highest of the four downcomers 11' devoid of any downcomer inlets, after which the inlet of the lowermost downcomer 11 of the upper set of four was attached. Successive higher downcomers 11 were spotted symmetrically at 90° equiangular spacings at longitudinal levels 8" apart from one another. The inlet of the highest downcomer 11 was located approximately 30" below the level of the nominal fill line X—X, which itself was disposed about 18" below the top of cylindrical portion 10. The test blender thus had a maximum blending capacity of about 22 ft.$^3$, equivalent to about 1000 lbs. of polyethylene beads, although the solids holding capacities of the several components of the system aggregated about 25 ft.$^3$ during typical operation, made up of about 1.8 ft.$^3$ capacity for the cone bottom 12, 19.6 ft.$^3$ capacity for the cylindrical portion 10 and 3.6 ft.$^3$ for solids in transit or temporary hold up within the nine downcomers and the two collectors.

The raw solids feed introduction facility for the test solids blender was of similar design to that utilized in the blender preferred design hereinbefore described. Also, solids draw-off from the cone 12 apex via downcomer 11" into lower collector 30 was adhered to with slide valve 39 carried half open, and there was also diversion of solids product into collector 30 via cross-connection J through half-open slide valve 23. It was found that approximately constant solids flow was preserved through valve 23 without changing its setting, independent of whether product was drawn from the system via conduct 21 or whether recycle was being conducted without any product withdrawal whatsoever.

In the following run of the test blender, operation was deliberately conducted at about 90% effective blending capacity, i.e., with maximum solids level carried within cylindrical portion 10 only up to about 12" below the level line X—X, in order to simulate certain extreme unfavorable operating conditions which might conceivably be encountered in a full scale commercial unit. Thus, 660 lbs. of white polyethylene beads were first charged into the blender, recycle commenced at a rate of about 1000 lbs./hr. and 250 lbs. of yellow polyethylene beads fed into the recycle stream at the same feed rate of 1000 lbs./hr., until a total of 910 lbs. of solids was in the blending system. During this interval of approximately 15 mins. duration no samples were withdrawn for evaluation.

As the recycle was thereafter continued in operation, a product stream was steadily withdrawn via conduit 21 at the same rate as the recycle stream flow, namely, 1000 lbs./hr. This product withdrawal was continued until 250 lbs. of solids was removed from the system, during which elapsed time of about 15 minutes 20 individual product samples of about 1.0 lb. each were taken at 12 lb. product flow intervals. At this point, which was well below the 75% volumetric operating level of test blender design capacity, product draw-off was halted, along with sample taking, and a replacement amount of 250 lbs. of white polyethylene beads was charged in while recycle proceeded as usual, which again required about 15 minutes elapsed time. This completed an operational cycle, after which product draw-off was again initiated with sample taking as hereinbefore described, and operation repeated in all respects as detailed until four such cycles were completed, during which a total of 1000 lbs. of product had been removed from the blending apparatus.

The content of colored material in individual samples is plotted as the succession of points making up Trace A of FIG. 6.

To afford a measure for comparison, plot B, constituting the actual measured cumulative average of yellow polyethylene beads remaining in the solids mixture (taken on the basis of each quarter's solids accumulation), has been drawn in in FIG. 6.

In appraising the operation of the test blender it must be borne in mind that almost the most extreme of unfavorable conditions were deliberately imposed in the test reported in order to better determine how well the new design overcomes handicaps. Thus, the use of a different colored polyethylene as the off-specification additive (i.e., a relatively large quantity of yellow to the usual run white) constitutes a completely unrealistic excessive quantity loading of an absolutely off-specification substance which would never be tolerated in regular manufacturing practice, where the most extreme deviations to be accommodated, batch-to-batch, are 50 to 100 orders of magnitude smaller. In addition, less than full volumetric capacity blending (e.g., 90% full, as compared to 100% full) was adhered to, penalizing the apparatus further, and, finally, relatively heavy product draw-off was resorted to, as compared to recycle activity carried out during the time span of any given cycle.

Despite all this, it will be seen that yellow-colored polyethylene appeared in the product stream at Sample No. 7, i.e., after only about 33% of the equivalent of the first charge had been withdrawn. The concentration of colored solids thereafter increased to approximately 27.5%, the theoretical average of colored material originally in the mixture, during the closing part of the first cycle and remained nearly constant into the second cycle, i.e., after the first 250 lb. batch of replacement solids had been loaded into the system. The colored solids content thereafter decreased slightly to about the halfway point of the second cycle, increasing again, however, at the end to somewhat over 27.5%. The general pattern of colored solids variance thereafter repeated itself during the third cycle, with the average colored solids content progressively diminishing at a somewhat increased rate, finally tapering off through the fourth cycle (not shown in FIG. 6).

The operation detailed is considered markedly superior to that of all known types of blenders, gravimetric or otherwise, now available, the ironing out of concentration peaks of additive being especially significant and the relatively close agreement of adjacent sample colored concentrations confirming the reliability of the performance plot. Moreover, the perturbation represented by the rapid catch-up of colored solids from the zero level at the outset of the first cycle to a near-plateau level not excessively above the average reveals a high inherent damping effect, which results in maintenance of the concentration of the colored adulterant in a region which is reasonably tolerable to the user of the product.

It was concluded from the test results that the blender of this invention should preferably be operated on a continuous basis above about 75% of the design solids volume. In addition, recycle at a ratio of about twice the withdrawal rate, as well as twice the charging rate, appeared advantageous in leveling out concentrations of off-specification material to achieve best uniformity of product. Finally, near-continuous return of any solids in recycle, as well as make-up feed, improves blending, maintaining, as it does, the continuity of the loop of material flow in process during the entire blending operation.

A variety of special effects are obtainable by the utilization of re-entry conduits 43. These permit the accelerated transfer, lengthwise of the blender, of solids from a given region at a higher level to given region at a lower level within the blender, as might be desirable in special situations where materials of specific characteristics must be blended relatively rapidly with a base material of widely different characteristics. In addition, the individual flow characteristics of different solids to be blended can make the use of re-entry conduits 43 especially desirable. In actual tests not detailed herein, re-entry downcomers demonstrated a decided capability for dissipating, and at the same time equalizing throughout the first half or one third of operation, peak concentrations which would normally occur much later in the blending operation. Normally, however, it is completely practicable to dispense with re-entry facilities entirely. Moreover, while cross connection from upper collector to lower collector (as via conduit 22) is usually desirable, as is also direct dis-via conduit 22) is usually desirable, as is also direct discharge from the bottom of the blending vessel into the second collector (via conduit 11″), one or both of these refinements can be dispensed with while still retaining appreciable advantages through the use of twin collectors individually serving the lower quarter and the remainder of the blending vessel, and this invention is accordingly not limited to the preferred embodiment of FIGS. 1–5.

In some instances, where relatively high rates of recycle are maintained, as in the test blender described, localization of product draw-off and re-entry draw-off to the individual collectors reserved substantially exclusively for each is facilitated by providing a "buffer zone" consisting of an appreciable mass of solids maintained between the regions in the column provided with the downcomers discharging into the respective collectors. However, at somewhat lower recycle rates, this is not essential.

With some solids having relatively poor flow characteristics, or in some use situations where replacement feed material is possessed of markedly different characteristics than predecessor solids constituting the base charge existing within the blending apparatus, it can be desirable to accelerate the flow of some material from the upper regions of the apparatus into the lower quarter portion from which product is withdrawn. This can be readily achieved by providing re-entry conduits 43 in a wide variety of patterns, or even by fitting the blender with a central internal downcomer having its inlet located at the upper level from which solids of desired analysis are to be removed and the discharge outlet located within or adjacent to, the lower quarter level of solids in the apparatus. However, this invention contemplates the dilution within the lower quarter of the bulk of the material thus supplied in accelerated flow from higher regions, with the restriction of obtainment of product to at least 75% from the lower 25% of the volume of the mass of solids contained within the blending vessel.

Blending according to this invention can be practiced with vessels which need not be cylindrical in form, all as taught in Re. Patent 25,687 supra, and can, if desired, utilize downcomers mounted completely internal of the blending vessel. It has been ascertained that a somewhat expanded range of downcomer placement is feasible with this invention than with said patented construction, in that only a minimum overall length of about 75% of the column length, as compared with the 80% previously taught, need be fitted with downcomers. In addition, downcomers can be manifolded into common solids withdrawal composite courses where this is advantageous, particularly where the inlets are separated by small angular spacings one from another, in the same manner as taught in Reissue Patent 25,687. Finally, the twin collection blending process of this invention is, of course, entirely suited to combination with the process and apparatus for particle deagglomeration and dust seperation taught in U.S. application Ser. No. 355,395, filed in the name of one of the present inventors.

From the foregoing, it will be understood that this invention is adapted to relatively wide modification within the skill of the art without departure from its essential spirit, and it is accordingly intended to be limited only within the scope of the subjoined claims.

What is claimed is:

1. The method of blending solids comprising confining a mass of the heterogeneous solids in an elevated column to which fresh solids to be blended are added at the top, withdrawing from said mass in a generally vertical direction and within about one-fourth of the distance from the center of said mass to the confining wall of said column taken at the level of withdrawal inwardly from the periphery of said mass substantially equal amounts of said solids per unit time simultaneously by gravity flow from a multiplicity of regions disposed lengthwise of said mass and substantially equiangularly around said periphery of said mass, collecting solids withdrawn from said mass as a first blended product fraction derived in the proportion of at least 75% from the lower 25% of the volume of said mass of said heterogeneous solids in said elevated column, collecting the remaining solids withdrawn from said mass as a second fraction separate from said first blended product fraction, and recycling said second fraction to the top of said elevated column.

2. A method of blending solids according to claim 1 wherein at least a portion of said first blended product fraction is diverted into said second fraction.

3. A gravity-flow solids blender comprising, in combination, a top-loading elevated vessel provided with a multiplicity of downwardly oriented gravity-flow solids withdrawal means having solids inlet ports communicating with said vessel with inlet openings disposed inward of the wall of said vessel up to about 25% of the distance from the confining wall of said vessel to the center of said vessel in the general horizontal plane containing said openings at substantially equiangular intervals with respect to one another and spaced lengthwise, a first common solids collector reserved to the removal of blended product in open communication with preselected ones of said solids withdrawal means delivering, in the aggregate, a blended product fraction derived in the proportion of at least 75% from the lower 25% of the solids-retaining volume of said elevated vessel, a second common solids collector in open communication with the remaining ones of said solids withdrawal means exclusive of said preselected ones in open communication with said first common solids collector, and solids recycling means in open communication on the intake side with the discharge of said second common collector and on the delivery side with the top of said elevated vessel.

4. A gravity-flow solids blender according to claim 3 wherein said first common solids collector is disposed at a higher elevation than said second common solids collector and there is provided a conduit in open communication between said first common solids collector and said second common solids collector for diversion of a preselected portion of solids collected within said first common solids collector to said second common solids collector.

5. A gravity-flow solids blender according to claim 3 provided with solids-re-entry means each comprising conduit means opening at a preselected first level into said elevated vessel and discharging into said elevated vessel at a preselected second level at lower elevation than said first level.

6. A gravity-flow solids blender comprising, in combination, a top-loading elevated vessel having an open cylindrical section joined at the bottom to an inverted conical section provided at the apex with a central draw-off opening, a multiplicity of downwardly oriented gravity-flow solids withdrawal means having solids inlet port communicating with said vessel with inlet openings ports communicating with said vessel with inlet openings disposed radially inward of said vessel up to about 25% of the radius of said vessel taken in the general horizontal plane containing said openings at substantially equiangular intervals with respect to one another and spaced lengthwise throughout at least said cylindrical section, a first common solids collector reserved to the removal of blended product in open communication with preselected ones of said solids withdrawal means delivering, in the aggregate, a blended product fraction derived in the proportion of at least 75% from the lower 25% of the solids-retaining volume of said elevated vessel, a second common solids collector in open communication with the remaining ones of said solids withdrawal means exclusive of said preselected ones in open communication with said first common solids collector, and solids recycling means in open communication on the intake side with the discharge of said second common collector and on the delivery side with the top of said elevated vessel.

7. A gravity-flow solids blender according to claim 6 wherein said central draw-off opening of said apex is connected in open communication with said second solids collector.

References Cited by the Examiner
UNITED STATES PATENTS

| | | | |
|---|---|---|---|
| Re 25,687 | 11/1964 | Arthur et al. | 259—180 |
| 455,082 | 6/1901 | Wilson | 259—180 |
| 3,158,362 | 11/1964 | Seifarth | 259—180 |
| 3,208,737 | 9/1965 | Brown | 259—180 |
| 3,268,215 | 8/1966 | Burton | 259—180 |
| 3,273,864 | 9/1966 | Thomson | 259—180 |

WILLIAM I. PRICE, *Primary Examiner.*